(12) United States Patent
Rossbach et al.

(10) Patent No.: US 8,661,449 B2
(45) Date of Patent: Feb. 25, 2014

(54) TRANSACTIONAL COMPUTATION ON CLUSTERS

(75) Inventors: Christopher J. Rossbach, Menlo Park, CA (US); Jean-Philippe Martin, Mountain View, CA (US); Michael Isard, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 208 days.

(21) Appl. No.: 13/163,024

(22) Filed: Jun. 17, 2011

(65) Prior Publication Data

US 2012/0324472 A1 Dec. 20, 2012

(51) Int. Cl.
*G06F 9/46* (2006.01)
(52) U.S. Cl.
USPC ........................................................ 718/106
(58) Field of Classification Search
None
See application file for complete search history.

(56) References Cited

U.S. PATENT DOCUMENTS

| | | | |
|---|---|---|---|
| 5,499,364 A | 3/1996 | Klein et al. | |
| 6,988,183 B1 * | 1/2006 | Wong | 712/208 |
| 7,290,056 B1 | 10/2007 | McLaughlin, Jr. | |
| 7,403,945 B2 | 7/2008 | Lin et al. | |
| 7,478,400 B1 | 1/2009 | Banerjee et al. | |
| 7,546,422 B2 | 6/2009 | George et al. | |
| 2003/0200540 A1 * | 10/2003 | Kumar et al. | 717/161 |
| 2007/0192545 A1 * | 8/2007 | Gara et al. | 711/141 |
| 2008/0082644 A1 * | 4/2008 | Isard et al. | 709/223 |
| 2008/0098375 A1 * | 4/2008 | Isard | 717/149 |
| 2009/0144218 A1 * | 6/2009 | Bonawitz et al. | 706/52 |
| 2009/0249004 A1 * | 10/2009 | Wang et al. | 711/162 |
| 2010/0241828 A1 | 9/2010 | Yu et al. | |
| 2011/0276966 A1 * | 11/2011 | Christensen et al. | 718/100 |
| 2011/0283095 A1 * | 11/2011 | Hall et al. | 712/228 |

OTHER PUBLICATIONS

Brito, et al., "Minimizing Latency in Fault-Tolerant Distributed Stream Processing Systems", Retrieved at <<http://141.76.44.180/papers/preprint-brito2009icdcs.pdf>>, Proceedings of 29th IEEE International Conference on Distributed Computing Systems, 2009, pp. 10.
"Hadoop wiki", Retrieved at <<http://wiki.apache.org/hadoop/>>, Apr. 2008, pp. 5.
Isard, et al., "Dryad: Distributed data-parallel programs from sequential building blocks", In Proceedings of European Conference on Computer Systems (EuroSys), vol. 41, Issue 03, Mar. 21-23, 2007, pp. 59-72.

(Continued)

*Primary Examiner* — Emerson Puente
*Assistant Examiner* — Dong Kim
(74) *Attorney, Agent, or Firm* — Micah Goldsmith; Andrew Sanders; Micky Minhas

(57) ABSTRACT

Computations are performed on shared datasets in a distributed computing cluster using aggressive speculation and a distributed runtime that executes code transactionally. Speculative transactions are conducted with currently available data on the assumption that no dependencies exist that will render the input data invalid. For those specific instances where this assumption is found to be incorrect—that the input data did indeed have a dependency (thereby impacting the correctness of the speculated transaction)—the speculated transaction is aborted and its results (and all transactions that relied on its results) are rolled-back accordingly for re-computation using updated input data. In operation, shared state data is read and written using only the system's data access API which ensures that computations can be rolled-back when conflicts stemming from later-determined dependencies are detected.

18 Claims, 5 Drawing Sheets

(56) References Cited

OTHER PUBLICATIONS

Kulkarni, et al., "Optimistic parallelism requires abstractions", Retrieved at <<http://www.cs.cornell.edu/~kb/publications/Galois_PLDI07.pdf, In Proceedings of the 2007 ACM SIGPLAN conference on Programming language design and implementation, vol. 42, Issue 06, Jun. 11-13, 2007, pp. 211-222.

Olston, et al., "Pig Latin: A not-so-foreign language for data processing", Proceedings of the 2008 ACM SIGMOD international conference on Management of data, Jun. 9-12, 2008, pp. 12.

Yu, et al., "DryadLINQ: A system for general-purpose distributed data-parallel computing using a high-level language", Retrieved at <<http://research.microsoft.com/en-us/projects/DryadLINQ/DryadLINQ.pdf>>, In Proceedings of the 8th Symposium on Operating Systems Design and Implementation (OSDI), Dec. 8-10, 2008, pp. 1-14.

* cited by examiner

100

TRANSACTIONAL COMPUTATION ON CLUSTERS

BACKGROUND

Distributed computing is the use of multiple autonomous computers (or processors) to solve computational problems by dividing the problem into many sub-problems that are then solved by one or more of the autonomous computers (or nodes) in a cluster of computers. Distributed shared memory (DSM) is an aspect of distributed computing where each node of a cluster has access to shared memory that is distributed across the cluster and which may comprise local memory, remote memory, or both with regard to each node. Certain performance-critical workloads—such as those requiring more memory or processing power than is available in a single computer—can benefit from the abstraction of a mutable (changeable) shared state that is made possible via distributed computing systems employing distributed shared memory.

To perform computations on very large datasets, distributed computing clusters (comprising, for example, tens to thousands of autonomous computers) employing distributed shared memory may be utilized. However, many computations (and their associated algorithms) may be challenging to parallelize because of the possibility of dependencies existing between certain sub-computations and the inherent difficulty in determining these dependencies in advance. A conservative approach to handling possible dependencies is to wait for prior sub-computations to complete before running subsequent sub-computations that possibly depend on those prior sub-computations, but such an approach requires a substantial amount of synchronization between parallel processes (the autonomous computers via the computer network, for example) which in turn become a substantial bottleneck to efficient computational performance.

Computational dependencies, however, may be relatively rare for certain useful computations compared to the total number of computations over an entire large dataset, and in such instances the vast majority of individual computations (and sub-computations) will have no such dependencies. Thus most computations (and sub-computations) need not be delayed since they do not depend on the completion of other computations, but the seeming difficulty lies in the inability to identify and separate in advance the computations having dependencies from the computations that do not.

SUMMARY

To provide high-performance computing over distributed shared memory, various implementations disclosed herein are directed to performing computations on shared datasets in a distributed computing cluster using aggressive speculation and a distributed runtime (an instance of a distributed execution engine) that executes code transactionally. Various implementations conduct speculative transactions with currently available data on the assumption that no dependencies exist that will render the input data invalid. For those specific instances where this assumption is found to be incorrect—that the input data did indeed have a dependency (thereby impacting the correctness of the speculated transaction)—the speculated transaction is aborted and its results (and, generally, all transactions that relied on its results) are rolled-back accordingly for re-computation using updated input data. For these various implementations, shared state data is read and written using only the system's data access API which is specifically designed to ensure that computations can be rolled-back when conflicts stemming from later-determined dependencies are detected.

In addition, since a speculated transaction can be aborted and/or rolled-back if the input data it utilizes turns out to be inaccurate, these various implementations make it possible to aggressively pre-fetch data and complete speculative transactional computations that, much more often than not, will ultimately be found to have no dependencies and thus be correct. This approach, in turn, results in reduced latency of synchronization since it is not necessary to wait to ensure all possible dependencies are completed before completing machine-level computations—which, again, will be correct except when a dependency impacting the input data is later found (which may be relatively rare). Similarly, the runtime for several implementations further reduces synchronization latency by executing subsequent children transactions speculatively and, if conflicts are later found with the parent speculative transactional computation, the runtime aborts or rolls-back these children computations.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

To facilitate an understanding of and for the purpose of illustrating the present disclosure and various implementations, exemplary features and implementations are disclosed in, and are better understood when read in conjunction with, the accompanying drawings—it being understood, however, that the present disclosure is not limited to the specific methods, precise arrangements, and instrumentalities disclosed. Similar reference characters denote similar elements throughout the several views. In the drawings.

DETAILED DESCRIPTION

Figure 1:
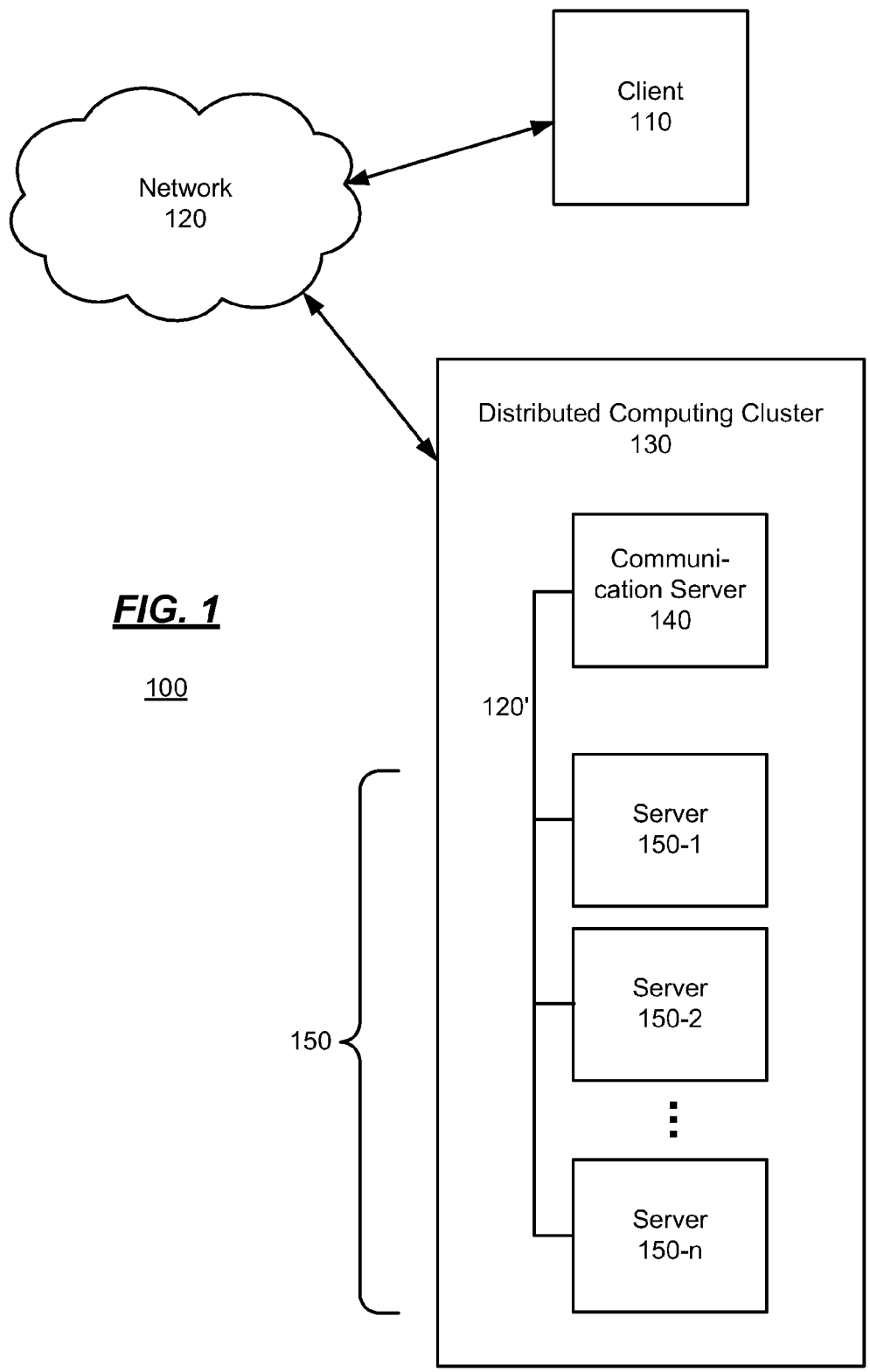
FIG. 1 is an illustration of an exemplary networked computer environment in which the numerous implementations disclosed herein may be utilized.

Distributed computing is a form of computing in which many calculations are carried out simultaneously on the premise that large problems can often be divided into smaller problems which can be solved concurrently ("in parallel") for efficiency. However, distributed computing programs are more difficult to write than sequential ones because concurrency ("operating in parallel") introduces several new classes of potential bugs, conflicts, data access issues, and utilization inconsistencies, as well as a host of other potential errors. Consequently, communication and synchronization between the different concurrent processes can be major challenges to achieving good efficiency and consistency. For this reason, most distributed computing systems use some kind of consistency model that defines rules for how distributed computing operations occur and how results are produced.

There are several different forms of distributed computing, such as bit-level, instruction level, task level, and data parallelism. This last form, data parallelism, focuses on distributing the data across different computing nodes (machines or processors) to be processed in parallel such as, for example, parallelism inherent in program loops where similar (though not necessarily identical) operation sequences or functions are being performed on elements of a large data structure (which are common to many scientific and engineering applications).

A multicore processor is a processor that includes multiple execution units ("cores") on the same chip. As such, a multicore processor can issue multiple instructions per cycle from multiple instruction streams. A multiprocessor computer, in comparison, is a stand-alone computer system (or "machine") with multiple processors that share memory and may connect via a bus, point-to-point links, or other high-speed means; however, "bus contention" (where more than one processor attempts to use the bus at the same time) and similar limitations may prevent these computer systems from scaling to more than thirty-two (32) processors. As such, a multiprocessor computer may comprise one or more multicore processors for adding computational power.

A distributed computer (sometime referred to as a distributed memory multiprocessor) is comprised of multiple processors connected by a network (and thus is highly scalable) to solve computational problems using parallel computing (where a problem is divided into many sub-problems, each of which is solved by different processor). For example, a massively parallel processor (MPP) is a single stand-alone computer with many networked processors using specialized high-speed interconnect networks where generally each processor has its own memory, copy of the operating system, and copy of the application(s). In contrast, a cluster (or cluster computer system) is a distributed computer comprising multiple computer systems (each a "cluster computer," "autonomous computer," or a "machine") connected by a network where each machine has its own processing elements, memory, operating system, and applications, and the network generally comprises commodity networking hardware. A grid computer system (or grid) is similar to a cluster but where the networked computers communicate over the Internet which, because of its relatively low bandwidth and high latency, are the most distributed form of parallel computing and typically deals only with "embarrassingly parallel" problems, that is, problems that are easily split into parallel tasks that require little or no communication between such tasks.

A distributed computer—whether an MPP, a cluster, or a grid—may comprise one or more multiprocessor computers and/or comprise one or more multicore processors. There are also several specialized parallel/distributed computer systems based on reconfigurable computing systems with field-programmable gate arrays, general-purpose computing systems on graphics processing units, application-specific integrated circuits, vector processors, to name a few, for example.

Notwithstanding the foregoing, the terms "concurrent," "parallel," and "distributed" strongly overlap, and are used interchangeably herein such that a same system may be characterized as "parallel" and/or "distributed" without loss of generality such that processors in a distributed system run concurrently in parallel. Where distinctions are necessary and the terms are in disjunctive and in obvious conflict to a person of ordinary skill in the relevant art, then the term "parallel" as used in parallel computing shall refer to all processors having access to a shared memory that can be used to exchange information between processors, whereas the term "distributed" as used in distributed computing shall refer to each processor having its own private memory (a part of the "distributed memory") where information is exchanged by passing messages between the processors (presumably through an intermediary of some kind).

While various implementations disclosed herein are described in terms of a distributed computing system and, more specifically, in terms of a cluster computer system (or "distributed computing cluster"), skilled artisans will readily recognize that such implementations can readily be implemented on other types of distributed computing systems, and nothing is intended to limit the implementations disclosed herein to any specific distributed computer type nor to any specific configuration of processors such as multiprocessors but, instead, are intended to be given the widest interpretations possible.

FIG. 1 is an illustration of an exemplary networked computer environment 100 in which the numerous implementations disclosed herein may be utilized. The network environment 100 may include one or more clients, such as a client 110, configured to communicate with each other or with one or more servers, such as a communication server 140, through a network 120. The network 120 may be a variety of network types including the public switched telephone network (PSTN), a cellular telephone network, and a packet switched network (e.g., the Internet). While the client 110 and the server 140 are illustrated as being connected by the network 120, in some implementations it is contemplated that the client 110 and the server 140 may be directly connected to each other or even executed by the same computing system.

As shown in FIG. 1, and for several implementations disclosed herein, the communication server 140 may be part of a distributed computing cluster 130 comprising the communication server 140 and other computers (or processors) in a processing cluster 150 comprising a plurality of cluster machines (or simply "servers") 152-1, 152-2, . . . , 152-$n$ (each also referred to interchangeably as a "machine", "cluster server", "cluster computer," or "autonomous computer") interconnected by a network 120'. The communication server 140 may be a separate machine from the machines in the processing cluster 150 (as shown) or the communication server 140 may also comprise a machine in the processing cluster 150. Moreover, the network 120' may be local network of some kind (e.g., a local area network or LAN) or it may be an extension of a larger network such as network 120.

Figure 5:
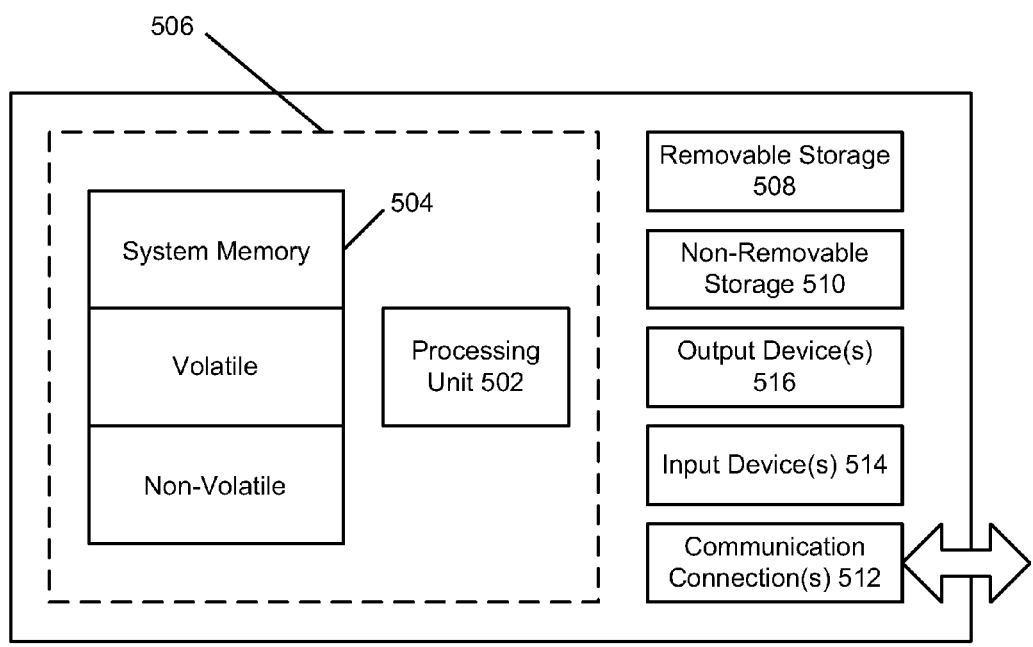
FIG. 5 shows an exemplary computing environment.

In some implementations, the client 110 may include a desktop personal computer, workstation, laptop, PDA, cell phone, smart phone, or any WAP-enabled device or any other computing device capable of interfacing directly or indirectly with the network 120 such as a computing device 500 illustrated in FIG. 5. The client 110 may run an HTTP client, e.g., a browsing program, such as MICROSOFT INTERNET EXPLORER or other browser, or a WAP-enabled browser in the case of a cell phone, PDA or other wireless device, or the like, allowing a user of the client 110 to access information available to it at the communication server 140 or to provide information to the communication server 140. Other applications may also be used by the client 110 to access or provide information to the communication server 140, for example. In some implementations, the server 140 may be implemented using one or more general purpose computing systems such as the computing device 500 illustrated in FIG. 5.

Figure 2:
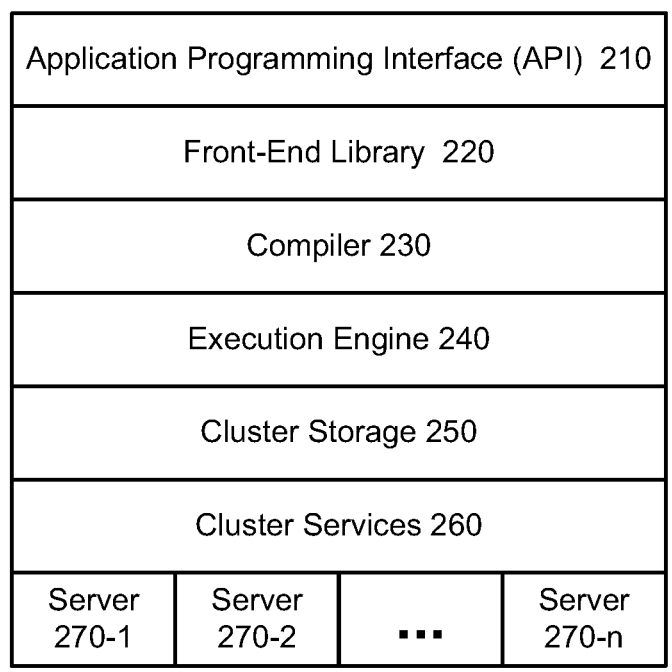
FIG. 2 is a block diagram representing an exemplary software stack for a distributed computing cluster representative of several implementations disclosed herein.

FIG. 2 is a block diagram representing an exemplary software stack 200 for a distributed computing cluster representative of several implementations disclosed herein. The software stack 200 comprises an application programming interface (API) 210, a front-end library 220, a compiler 230, an execution engine 240, cluster storage 250, cluster services 260, and a plurality of autonomous computing machines or servers 270-1, 270-2, . . . , 270-n.

The execution engine 240 is a software layer that coordinates the execution of multiple dependent programs (processes) running on a computer cluster and communicating with each other through messaging channels. The execution engine 240 may also handle the reliable execution of the cluster servers 270-1, 270-2, . . . , 270-n via the cluster storage 250 and cluster services 260 layers—that is, the execution engine 240 may schedule computations to the cluster computers, monitor their execution, collects and reports statistics, and handle transient failure in the cluster by re-executing failed or slow computations.

The compiler 230, aided by functionality provided by the front-end library 220 and API 210, translates specific computations into jobs that can be executed on a cluster by the execution engine 240. The compiler 230 provides a set of operators that perform computations on collections of values where, for certain implementations, the specific language may be similar to the SQL database language and the collections are the equivalent of database tables. In addition, collections may be partitioned by the compiler 230, with different partitions residing on different machines in the cluster. During computation, the collection elements may be moved between computers, so the in-memory data structures are serialized to a shared physical medium such as a disk or the network. To this end, the compiler 230 automatically generates serialization and de-serialization code, although for certain implementations a user might replace the default serialization routines with custom routines.

For some implementations—and unlike SQL—the compiler 230 may be "embedded" within, for example, the ".NET languages" such that there are operators for C#, VB, and F#, for example. For several implementations, the basic compiler 230 operations may comprise (1) applying a transformation (function) to all elements in a collection, (2) filtering elements according to a predicate, (3) grouping elements by a common key, (4) aggregating the elements according to some function (e.g., addition), and (5) joining the elements in two collections using a common key. Thus, for a user/programmer of the system, a benefit of the compiler 230 is the provision of a single high-level programming language (e.g., a ".NET language") to write the application and blending seamlessly the local and distributed parts of the computation in a single program due to tight embedding of the compiler 230 within these well-known languages.

In several implementations, the compiler 230 not only generates jobs but also generates parallel multi-threaded code for each of the processes in a job graph to utilize multiple processing cores. In certain such implementations, the parallelization across cores may use similar techniques to the parallelization across machines. The compiler 230 translates the operations on the large collections into operators on individual partitions which are then further partitioned across cores and processed in parallel. Moreover, for some implementations, the compiler 230 may provide a generalization of the map-reduce computation model—comprising a particular sequence of operators such as, for example, SelectMany, GroupBy, and Aggregate—that is elsewhere implemented in both proprietary and open-source computation stacks known to those of skill in the art.

To perform computations on very large datasets, distributed computing clusters (comprising, for example, tens to thousands of autonomous computers) employing distributed shared memory may be utilized. However, many computations (and their associated algorithms) may be challenging to parallelize because of the possibility of dependencies existing between certain sub-computations and the inherent difficulty in determining these dependencies in advance. For example, an algorithm that performs fine-grain updates to a large shared data structure may benefit from such a system, although a challenge arises when these updates have an order that is difficult to predict statistically. A conservative approach to handling possible dependencies is to wait for prior sub-computations to complete before running subsequent sub-computations that possibly depend on those prior sub-computations, but such an approach requires a substantial amount of synchronization between parallel processes (the autonomous computers via a computer network, for example) which in turn become a substantial bottleneck to efficient computational performance.

Computational dependencies, however, may be relatively rare compared to the total number of computations over an entire large dataset, and in most instances the vast majority of individual computations (and sub-computations) have no such dependencies. Thus most computations (and sub-computations) need not be delayed since they do not depend on the completion of other computations, but a seeming difficulty lies in the inability to identify and separate in advance the computations having dependencies from the computations that do not.

To provide high-performance computing over distributed shared memory, various implementations disclosed herein are directed to systems and methods for performing computations on shared datasets in a distributed computing cluster using aggressive speculation and a distributed runtime (an instance of a distributed execution engine) that executes code transactionally (which, as used herein, means atomically and in isolation, with effects of a parallel execution of multiple transactions equivalent to those of a serial execution). These various implementations utilize aggressive speculation to hide the communication latency stemming from inter-nodal communications largely comprising remote memory access and synchronization of computations. This latency is frequently a bottleneck to performance gains when using distributed shared memory. Since the speculation will be correct in most instances, substantial parallelism can be gained. As for the instances where mis-speculation occurs (i.e., when a conflict arises when a dependency is discovered), such corresponding computations are aborted and/or rolled-back for re-computation. Distributed software transactional memory is used to detect dependencies and correct the corresponding conflicts stemming from aggressive speculation in such various implementations.

Various such implementations conduct speculative transactions with currently available data on the assumption that no dependencies exist that will render the input data invalid. For those specific instances where this assumption is found to be incorrect—that the input data did indeed have a dependency (thereby impacting the correctness of the speculated transaction)—the speculated transaction is aborted and its results (and all transactions that relied on its results) are rolled-back accordingly for re-computation using updated input data. For these various implementations, shared state data is read and written using only the system's data access API which is specifically designed to ensure that computations can be rolled-back when conflicts stemming from later-determined dependencies are detected.

Since a speculated transaction can be aborted and/or rolled-back if the input data it utilizes turns out to be inaccurate, these various implementations make it possible to aggressively pre-fetch data and complete speculative transactional computations that, much more often than not, will ultimately be found to have no dependencies and thus be correct. This approach, in turn, results in reduced latency of synchronization since it is not necessary to wait to ensure all possible dependencies are completed before completing machine-level computations—which, again, will be correct except when a dependency impacting the input data is later found (which may be relatively rare). Similarly, the runtime for several implementations further reduces synchronization latency by executing subsequent children transactions speculatively and, if conflicts are later found with the parent speculative transactional computation, the runtime aborts or rolls-back these children computations.

Certain implementations execute transactions in parallel even when program order specifies a control-flow dependency (i.e., even though a dependency is pre-identified) because control flow dependencies can be safely ignored (except to the extent control flow dependencies are needed to perform commits and roll-backs). Transactions that operate on the same elements of shared state, comprising the expected conflicts (which may also be relatively rare even though pre-identified), are handled the same as unexpected conflicts/dependencies where the subject computations are cancelled or rolled-back accordingly. Similarly, this approach gains the benefits of parallelism from the much larger portion of the workload ultimately having no dependencies and, thus, where the speculative results are ultimately correct.

Figure 3:
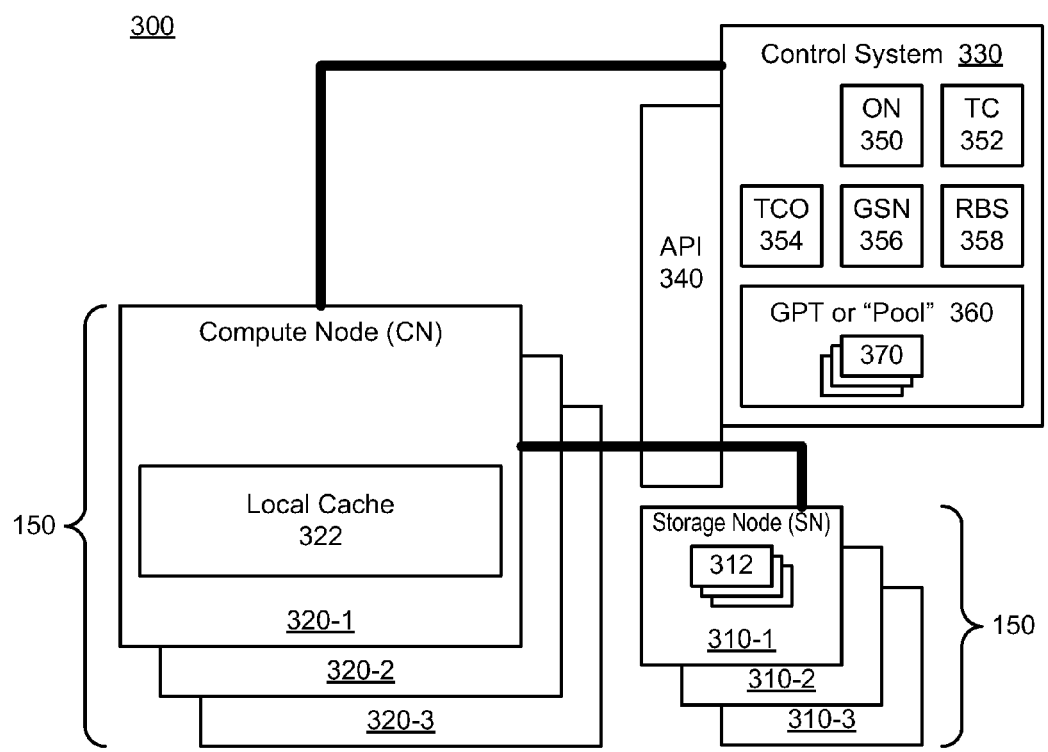
FIG. 3 is a block diagram of a system for distributed computing on a distributed shared memory system representative of several implementations disclosed herein.

FIG. 3 is a block diagram of a system 300 for distributed computing on a distributed shared memory system representative of several implementations disclosed herein. The system 300, distributed across the cluster machines 152-1, 152-2, . . . , 152-n of FIG. 1, for example, comprises a plurality of storage nodes 310-1, 310-2, . . . , 310-n (collectively 310 and each individually 310') and a plurality of compute nodes 320-1, 320-2, . . . , 320-n (collectively 320 and each individually 320'). The storage nodes store versioned data objects 312. The compute nodes further comprise a local cache 322. Each compute node 320 interfaces with and, via a system API 340, reads from and writes to each of the storage nodes 310.

A control system 330 manages the operations of compute nodes 320 (constituting a distributed computing subsystem) and their interactions with the storage nodes 310 (constituting the shared distributed storage or system "state"), and thus the control system 330 comprises the API 340 to perform such interactions (such as reads and writes). The control system 330 may also comprise an ordering node (ON) 350, a transaction coordinator (TC) 352, a transaction commit ordering (TCO) module 354, a global scheduling node (GSN) 356, a roll-back subsystem (RBS) 358, and a global pool of transactions (GPT or "pool") 360. Each of these components of the control system 330 may reside centrally for certain implementations or, alternately, in a distributed fashion (e.g., with the compute nodes) in other implementations. The pool 360 contains the tasks 370 that, together with a task graph (described in more detail later herein), represent the program to be executed by the system 300 over the shared distributed memory or state maintained in the storage nodes 310. These components are described in more detail herein.

Figure 4:
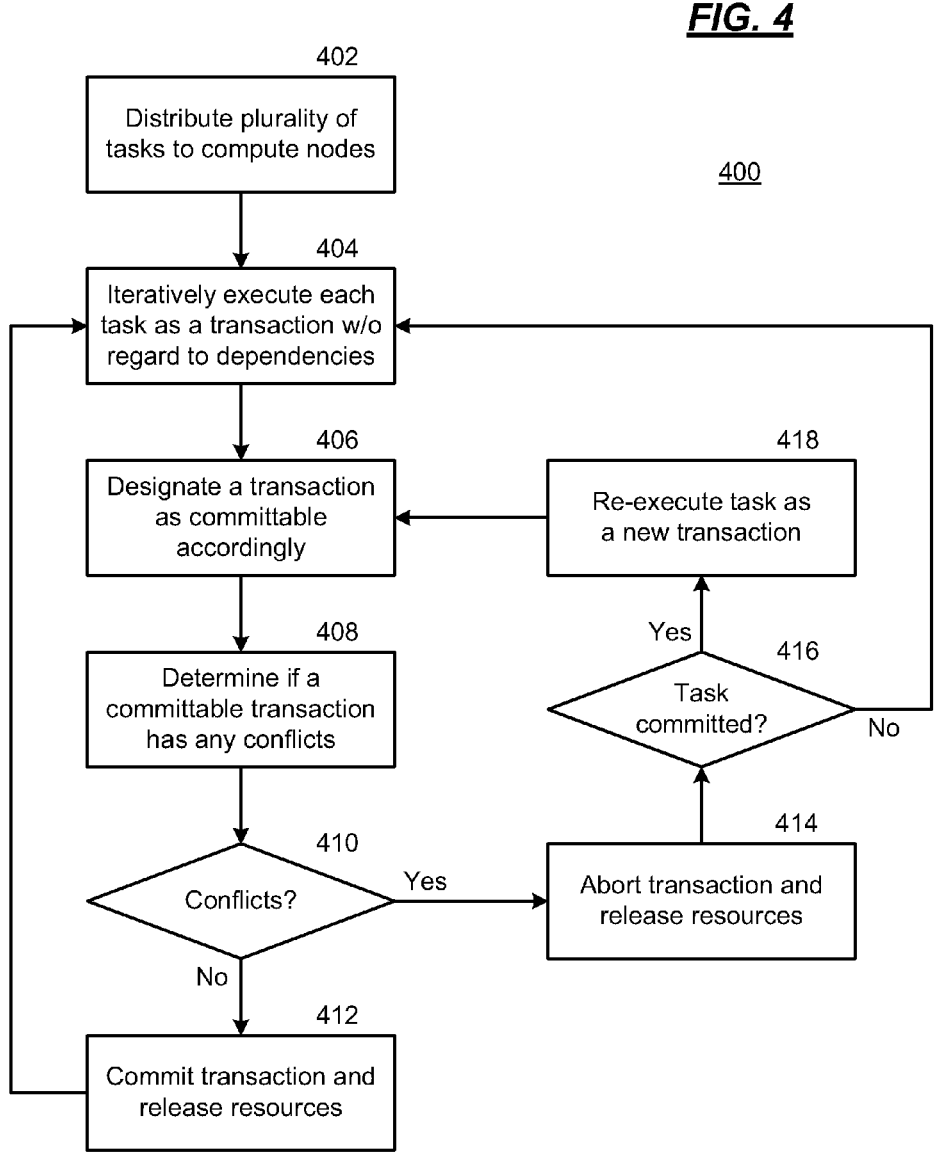
FIG. 4 is an operational flow diagram representative of a computation method for several implementations disclosed herein.

FIG. 4 is an operational flow diagram representative of a computation method 400 for several implementations disclosed herein. The method 400 begins at 402 by distributing a plurality of tasks representative of a computational program to a plurality of compute nodes for execution on the distributed shared memory. As discussed in greater detail below, the distributed shared memory comprises a plurality of storage nodes for storing a plurality of versioned data objects that together constitute system state data. The compute nodes, at 404, then iteratively execute each task they receive as a transaction (and in parallel if operating on a multi-core processor) without regard to possible dependency conflicts (also referred to interchangeably as just "dependencies" or "conflicts").

As each transaction completes, at 406, the transaction is then eventually designated as committable based on a traversal of a task graph corresponding to a dependency ordering of the plurality of tasks discussed later herein. At 408, each committable transaction is then assessed to determine if there are any conflicts using one of several methodologies discussed later herein. If at 410 no conflicts are found, then at 412 the transaction is committed and its resources are released for use in processing other uncommitted transactions at 404.

On the other hand, if there are conflicts at 410, then at 414 the transaction is aborted and its resources are released. Then, if at 416 the task corresponding to that transaction has not yet committed, that task is re-executed as a new transaction at 418; otherwise, it is unnecessary to re-execute the task (presumably because it was successfully executed and committed on another compute node), so the compute node can process another task at 404 until there are no more tasks left to commit.

With regard to the foregoing, and referring again to FIGS. 3 and 4, several implementations disclosed herein are directed to computation on a distributed shared memory system comprising several elements. For these implementations, the system may distribute a plurality of tasks (representative of a computational program) to a plurality of compute nodes for execution on the distributed shared memory system (which, in turn, comprises the storage nodes holding the versioned data objects that together constitute system state data). The system—namely the compute nodes—then execute each task from among the plurality of tasks (presumably from the pool) as a transaction without any regard to possible dependencies (i.e., as a "speculative transaction"). As each transaction completes and is then designated as "committable" (presumably based on a traversal of a task graph corresponding to a dependency ordering of the plurality of tasks), the system then determines whether the committable transaction has any conflicts. If there are no conflicts, then the system can commit that transaction, and the system also indicates that the corresponding task for that transaction has been committed and no longer needs to be processed (and thus permits any running processes for that task to be aborted). Conversely, if the transaction is found to have at least one conflict, then the system aborts that transaction and, if the corresponding task has not yet been committed by another transaction somewhere in the system, then that task may be re-executed as a new transaction.

As noted earlier herein, each compute node comprises a local cache and, for certain such implementations, the compute node may further comprise a read set and write set for each transaction executing on the compute node, as well as a dependency graph for tracking local dependencies as they arise. The cache stores the copied versioned data objects the compute node reads from the storage nodes (as well as the new versions written by the storage nodes transactions). Regarding the latter, and for certain implementations, when a versioned data object is to be used for a computation for a transaction but a copy of the versioned data object does not already reside in the local cache, the compute node reads the versioned data object from its storage node and stores a copy of that versioned data object in the local cache and, for some implementations, may also update a read set corresponding to the transaction, and then the system uses the copy of the versioned data object from the local cache to complete the computation for the transaction.

When making an "update" to the versioned data object for a transaction, an approach for several implementations may be to write a new updated copy of the versioned data object to the local cache (with an undetermined version number) while leaving the original versioned data object in the local cache unchanged (to support roll-backs as well as version selection by subsequent transactions). The compute node may also modify the dependency graph with the new updated copy of the versioned data object and its dependency on the copy of the versioned data object to which the update was applied, as well as update a write set corresponding to the transaction to reflect the transaction's write.

For conflict detection, several implementations may first determine if any conflicts exist in the dependency graph, and then determine if any conflicts exist in the read set. To accomplish the latter, such implementations might first, for each versioned data object in the read set or the write set (or both), lock the corresponding versioned data objects in their storage nodes. Once successfully locked, then a comparison of each versioned data object in the read set to the corresponding versioned data object in the storage node can be made and, if all of the versioned data objects in the read set are the same version (i.e., have the same version number) as the corresponding data objects in the storage nodes, then return that no dependency conflicts exist so that a commit operation can finish. Otherwise, if any of the versioned data objects in the read set are not the same version as the corresponding data objects in the storage node, then return that at least one conflict exists so that the abort operation can commence. In some implementations the storage node may indicate which objects were in conflict, to aid the compute node in refreshing its cache.

To commit an updated version of a versioned data object from a write set to its storage node, several implementations may overwrite the corresponding versioned data object in that storage node with the versioned data object in the write set while incrementing accordingly the version indicator (or version number) for that versioned data object in the storage node. Once all overwrites for the write set have been completed (and now irrevocably committed), each versioned data object in the read set or the write set (or both) is then unlocked in their respective storage nodes. In addition, some such implementations may update the task graph for the task corresponding to the transaction (as "committed") as well as update the dependency graph for each versioned data object in the write set to reflect the new committed version of the versioned data object (and possibly leading to some selective aborting of transactions accordingly). Conversely, aborting a transaction in such implementations might be accomplished by (in no particular order): (a) unlocking the versioned data objects in the storage nodes that were previously locked (i.e., for each versioned data object in the read set or the write set or both); (b) aborting the transaction; and (c) aborting any subsequent transactions dependent upon the transaction as indicated by the dependency graph.

With regard to the system of FIG. 3, and for various implementations disclosed herein, the distributed shared memory may comprise a plurality of storage nodes for storing versioned data objects constituting the system's "state" (a.k.a., "shared state"). As such, the distributed computing subsystem may then comprise compute nodes for executing a program that has been divided into a plurality of tasks for execution as transactions in accordance with a task graph describing acceptable ordering of the tasks. Moreover, to discover additional parallelism, the transactions are executed speculatively, that is, without regard to dependency conflicts (including ignoring the task graph) and effectively presuming (i) that the transaction's corresponding task has no dependencies and (ii) that any versioned data objects used are valid. Of course, one or both presumptions may not hold true, but when they do, there is a gain in discovered parallelism and when they do not, they are aborted and rolled-back accordingly. In addition, certain implementations may also comprise a control subsystem to, for example, determine when a task is committable and either committed or aborted. The control subsystem, in turn, may comprise a roll-back subsystem for aborting a task and, when appropriate, any additional tasks dependent upon the aborted task.

With regard to transaction reads and writes, several implementations may utilize an local-cache-centric approach where each compute node reads a versioned data object from a corresponding storage node from among the plurality of storage nodes and stores a copy of the versioned data object to the local cache if and only if a transaction needs the versioned data object and a copy of the versioned data object is not already present in the local cache. By focusing on the local cache contents, such implementations can restrict transactions such that they can only read the copies of versioned data objects residing in the local cache and, similarly, can only write updated versioned data objects to the local cache. Of course, such implementations may also store a read set and a write set for each transaction on the compute node, as well as a dependency graph for transaction on the compute node and an ordered list of each versioned data object read and written to the local cache.

For certain implementations, the control subsystem permits each compute node to attempt to commit a transaction corresponding to a task from among a plurality of tasks if and only if the transaction has completed running, the task corresponding to the transaction has no preceding tasks in the task graph that have not been committed, and the transaction has no preceding transactions in the dependency graph that have not been committed. The commit will succeed if every copy of the versioned data objects in the transaction's read set are the same version as the versioned data objects in the plurality of storage nodes. For other implementations, the control subsystem may be distributed across the plurality of compute nodes and thus comprise, for example, a distributed transactional commit protocol to detect dependency conflicts.

With regard to the system of FIG. 3, several implementations may comprise three high-level operations as follows: (1) for each task from among the plurality of tasks, repeatedly executing the task as a set of transactions comprising at least one transaction until the task is committed, wherein each such transaction runs without regard to possible dependencies; (2) designating a transaction as committable when all tasks in the task graph that precede the transaction's corresponding task have been committed; and (3) either committing each transaction designated as committable if it has no uncommitted dependency, or aborting each transaction having a conflict as well as aborting each transaction depending upon an aborted transaction (thus enabling the detection of a dependency conflict, aborting the transaction for which the conflict was found, and then aborting one or more additional subsequent transactions that inherently depended upon the aborted transaction). With regard to the third element, on one hand the commit ordering protocol may determine when it is safe to submit a given transaction for commit, while on the other hand the commit node may use local information to detect conflicts and abort transactions as a result (without necessarily communicating with other nodes). Moreover, this "other hand" (a.k.a., a "local abort") may be optional because the commit protocol itself would abort the transactions anyway since they have a conflict, although aborting them earlier may save resources. In addition, several such implementations may maintain a task graph corresponding to a dependency ordering of the plurality of tasks, as well as track each transaction's reads in a read set and writes in a write set, to support dependency conflict detection and rolling-back (by selective removals of bad data). Such implementations may also maintain, for each versioned data object in a local cache of a compute node, a sorted list of object versions to likewise assist with dependency conflict detection and support rolling-back (again by selective removal of bad data).

When processors are plentiful in a cluster, often the main bottleneck for performance is communication which is limited in both bandwidth and latency. To conserve bandwidth, compiling functional programs into dataflow graphs can yield some efficiencies; however, this approach is not well-suited for algorithms that are difficult to express functionally. For example, an algorithm that performs fine-grain updates to a large shared data-structure in an unpredictable order is difficult to express functionally.

Even though an algorithm is hard to express functionally, however, there may be a large amount of potential parallelism since many atomic operations (or "tasks") that comprise such programs operate on unrelated (or disjoint) elements of the data structure, and thus could possibly be executed in any order with respect to the other operations. Yet because the inter-relationship between operations that are disjoint versus operations that depend upon one another is extremely difficult to predict in advance, frequent synchronization is seemingly required to detect dependencies real-time in order to ensure correctness of the program execution, and the unavoidable latency of such extensive communication necessary for this level of synchronization is often more detrimental than any potential benefits that could be gained from parallel execution.

However, as embodied by several implementations disclosed herein, the performance penalty of this "synchronization latency" can be significantly mitigated in certain workloads using "aggressive speculation" to forge ahead with parallel executions on an assumption of correctness and then detect and undo any incorrect work. To aid in this detection, various implementations disclosed herein utilize software transactional memory and interfaces, thereby making "transactions" an implementation mechanism for speculation. Moreover, for the various implementations disclosed herein, the programming code executes as transactions, and an explicit graph structure is used to encode the control-flow dependencies between the individual transactions that comprise a program. In other words, the graph encodes the set of legal serialization orders for the transactions making up a program. This in turn permits the use of efficient algorithms known to skilled artisans to determine commit order, the side effects a transaction abort will have on its successor transactions, and so forth.

In addition, several implementations may annotate transactions with hints about the data they will access. This may also net additional benefits stemming from dataflow scheduling when data dependencies are known in advance since a scheduler can in principle inspect the task and transaction graph and make intelligent decisions about placement of computation and pre-fetching of remote data. In addition, data hints may be used to help select from the task graph the computation node for a given group of task (aggregating tasks that are likely to read each other's data) as well as assist in the selection of the computation node for a specific single task such as by placing that task on a computer that is near the storage node holding the data it needs. Moreover, data hints on the transaction graph might also be used to determine which transaction's data to pre-fetch first.

For various implementations disclosed herein, a program for execution is reduced to a set of atomic code fragments called "tasks" that are arrangeable in a directed-acyclic graph (DAG) referred to as the "task graph" representative of flow control. Thus the task graph imposes a partial order on the tasks that make up a program, and the valid execution of a program will be indistinguishable from a serialization of the tasks which respects the partial order. In addition, the task graph initially constructed to describe a program may be modified by a task during its execution by inserting ("forking" or "fork") a subgraph between itself and its immediate successors in the task graph—in effect, enabling the task to divide itself up into smaller tasks that could potentially be run in parallel.

For several implementations, whenever a task is added to the task graph the task may be assigned a unique task identification (TID), a generation number, and/or an ancestor vector. Moreover, when a task is executed, the execution of that task (referred to as a "transaction") may be assigned a unique execution id (EID). For example, the generation number and ancestor vector might be computed as follows: if the task has generation number 1.3.4 and ancestor vector 0.53.98 and the transaction has EID 134, then the second new task added by original task (i.e., the original task's second call to "fork") will have generation number 1.3.4.2 and ancestor vector 0.53.98.134. The ancestor vector can be used directly to determine the set of tasks forked by a particular transaction. Together with the generation number, the ancestor vector can be used to construct a test of partial ordering between two tasks.

For certain such implementations, the programs may be represented with a task graph that consists of a dummy task L (with TID 0, generation number 0, and ancestor vector 0), a root task R (with TID 1, generation number 1, and empty ancestor vector), and dummy task T (with TID 2, generation number 2, and empty ancestor vector) ordered so that L precedes R in the task graph, and R precedes T in the task graph.

For several implementations, each task may include a set of "arguments" (read-only for some implementations) that are specified at the time the task is forked. From that point forward, however, no other communications may occur between tasks except what can be achieved using the global set of shared date organized as versioned data objects (VDOs) that can potentially be created, read, written, or deleted by any task in accordance with the system's APIs and policies. Each VDO may have a unique identifier (OID) assigned at creation time and can be used to located the VDO among the system's storage nodes. In addition, tasks (and, specifically, a task's transaction) may generate "side-effects" that, for various implementations, may only comprise (a) modifications (create, update, or deletion) VDOs and (b) forking new tasks. Some implementations may allow additional side-effects, and using compensating actions certain implementations may thus effectively deal with some file creation/modification/deletion side effects.

The model for transactional execution employed by various implementations herein disclosed is based on software transactional memory designs but with the addition of speculation. For such implementations, each task is executed as a transaction which will either (a) be included in the serialization of the program as though it executed atomically or (b) will be aborted leaving no side-effects. As used herein, the term "transaction" is used to refer to an execution of a task.

Each task may be executed multiple times, and two transactions of the same task may be executed concurrently (presumably on different compute nodes, although it is possible for both to execute on the same compute node). However, no more than one transaction per task will be committed, and the program completes successfully when every task in the task graph has been committed. Thus a task is deemed committed when its first (and only) corresponding transaction is committed.

For various implementations, a transaction can exist in one of four states. When created—and a new transaction for any uncommitted task can be created at any time—that transaction starts in a Running state. Then, when the transaction finishes execution, it is in the Completed state. Although not committed, for some implementations the side-effects of the transactions' execution (e.g., new tasks or updated VDOs) may be made visible to other transactions when the transaction enters the Completed state; in other implementations, side-effects may be made visible to other transactions as they occur while the transaction is in the Running state. Either way, the system permits other transactions to speculation that these side-effects will be committed and to execute accordingly (and later be aborted if the speculation was incorrect).

When an uncommitted side-effect is used by second transaction—such as using a first transaction's updated VDO—a dependency is formed between the second transaction and the first transaction. These updates form a directed graph referred to as a "dependency graph" (DG). If a transaction aborts, then in some implementations all of its successors in the dependency graph are aborted (although this does not necessarily include all the tasks successors in the task graph), while in other alternative implementations some successors may survive if the re-execution of the original transaction yields the same value.

For various implementations, a transaction may transition from Completed to Committed if and only if all of its predecessors (preceding tasks) in both the task graph and dependency graph are already Committed. Of course, this condition could cause a deadlock (i.e., two tasks waiting for the other to commit before it can commit), but the system could detect this situation and use policy to select one transaction to abort in order to resolve the conflict and permit one transaction to commit (and the other transaction to re-execute and later commit). Regardless, for such implementations, when a transaction transitions from Completed to Committed, its side-effects are irrevocable and that transaction is removed from the dependency graph.

Many different approaches to detecting dependency conflicts are possible. Several implementations disclosed herein use versioning for shared objects (i.e., the versioned data objects, or VDOs, maintained by the storage nodes) such that, at any given time, there is only one committed version of each VDO, although there may be multiple visible but uncommitted versions of the VDO stored throughout the system (namely in compute nodes' caches) corresponding to updates made by transactions (and tasks) that have not yet been committed. In such implementations, versions can improve the effectiveness of speculation by helping maintain several possible updates to a VDO such that the correct one—whichever one that is—can be written to the VDO when the corresponding transaction commits. There is also a possibility of increasing the likely effectiveness of speculation by intelligently choosing which version a running transaction to utilize. In other words, when a transaction reads a VDO (presumably from the local cache), there may be multiple versions of that VDO available that were written by earlier transactions, and the system may use predetermined policies to intelligently decide which version the transaction to use in order to maximize its chances for success and minimize its risk of being aborted. However, there is a tradeoff between the efficiency gains from reducing unnecessary aborts versus the overhead incurred for making the reductions.

Certain implementations may also maintain, for each uncommitted transaction, (a) a ReadSet describing the set of VDOs read by the transaction and (b) a WriteSet containing the objects updated by the transaction. Although each committed VDO has a version number stored along with the object, when a transaction updates that VDO and adds it to its WriteSet the updated VDO initially has an undefined version number. Then, when the transaction is committed, the corresponding ReadSet and WriteSet are submitted to the transactional memory implementation. If, for every VDO in the transaction's ReadSet, the version number in the ReadSet is the same as the version number of the committed VDO still stored in the storage node, then the transaction succeeds and the VDOs in that transaction's WriteSet are atomically committed to the storage nodes (effectively overwriting the old version of the VDOs) and, during the commit, each new VDO (from the transaction's WriteSet) is allocated a new version number that is incremented from the previous VDO's version number. In addition, the committed version number for an updated VDO (the one just committed) is also stored into the ReadSet of any uncommitted transaction which referenced the updated VDO before it was committed, replacing the previously undefined version number value with the newly determined version number value. This in turn ensures that, since no transaction can commit before all of its predecessors in the dependency graph have committed, at commit time every VDO in the transaction's ReadSet will have a version number.

Of course, a transaction commit may fail due to a conflict that was not present in the dependency graph, such as when two transactions on different compute nodes read the same version of a VDO and then both later attempt to update the VDO such that the first transaction to do so will succeed but the second one will not (and will be re-executed using the new, updated version of the VDO provided by the first transaction). Yet this approach can detect these conflicts and correct them accordingly.

As previously discussed with regard to FIG. 3, several implementations disclosed herein run on a cluster of server computers and comprise a set of storage nodes (SN), a set of compute nodes (CN), and an ordering node (ON) that may be centralized in some implementations or distributed among the CNs (for example) in other implementations. Both SNs and CNs may be processes, in which case each computer may run more than one node; however, a typical deployment in several implementations may be to allocate an SN and a CN to every computer in the cluster, and then coordinate task scheduling and transaction commit ordering using the ON.

The shared objects (VDOs) are stored on the SNs, and each VDO may be assigned to a single SN at allocation time. The location of a VDO may be fixed throughout the program execution for certain implementations, while in other implementations the VDO might migrate between SNs. SNs store VDOs (the object's data and its version number) and may participate in a distributed transactional commit protocol, but do not directly compute or speculate as CNs do.

In contrast, a CN may (a) store a portion of the task graph (in distributed implementations) and execute transactions for the subset of the task graph that it stores; (b) maintain a local cache of committed and uncommitted VDOs; and (c) maintain in the local cache certain data structures to track subsets of the dependency graph.

The ON may store, for various implementations, the connectivity information for the entire task graph, as well as each task's TID, generation number, ancestor vector, and the CN that task is assigned to, as well as pointers to the task's immediate predecessors and successors in the task graph. Using the ON (centralized or distributed), if a first transaction executing a first task a completed at a CN forks a set of subsequent tasks and then the first transaction and first task are subsequently aborted, then the subsequent tasks (along with any tasks recursively forked by them) are aborted and removed from the task graph. The ON keeps state for each task and tracks if the task is Uncommitted, Committable, or Committed, and any task in the task graph whose predecessors are all Committed becomes eligible for commit and is marked Committable by the ON and the ON informs the CN hosting a transaction corresponding to the task. Conversely, whenever a CN successfully commits a transaction it informs the ON which marks the task corresponding to that transaction as Committed which, in turn, may then cause its immediate successor tasks to become Committable.

In numerous implementations, each CN may cache multiple versions of a VDO which may include the most recent known committed version of the VDO as well as versions contained in the WriteSets of uncommitted transactions at CN. These versions of a VDO may be maintained in a sorted list along with an auxiliary graph. (Both the sorted list and the auxiliary graph are local to the CN and each CN keeps its own independent data structures. When a transaction reads a VDO, the CN inspects the VDO's version list and, if empty, the CN fetches (reads) the VDO from the SN (which is the most recently committed version of the VDO), copies it to the local cache, and lists it in the version list. Otherwise, the CN locates an appropriate version of the VDO from the list. When a transaction writes (updates) a VDO, the VDO is buffered in the local cache until the transaction completes, at which point each VDO in the transaction's WriteSet is inserted into that VDO's sorted list.

As previously mentioned, a transaction may commit only if the ON has told the CN that the transaction's task is Committable. Moreover, a transaction may commit only if (a) it is the first transaction in the value-list for every object in the transaction's WriteSet, and (b) all transactions that wrote versions in the transactions ReadSet have committed. At this point, the CN may perform a two-phase distributed commit that includes all the SNs that store any VDO in either the transaction's ReadSet or WriteSet or both. In the first phase, the OID and version number of every object in the ReadSet, and the OID of every object in the WriteSet, is sent to the SN storing that object. The SNs acquire locks on the object (in OID order to prevent deadlock) and return success if objects in the ReadSet used their respective most recent committed versions, and return failure otherwise (which may lead to an abort in some implementations). If all SNs return success for the locks, then the second phase commits the new versions of the objects (VDOs) in the WriteSet and releases the locks. The CN can then commit the transaction.

FIG. 5 shows an exemplary computing environment in which example implementations and aspects may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communications connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD- ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of computation comprising:
   distributing a plurality of tasks representative of a computational program to a plurality of compute nodes that are coupled to a distributed shared memory system, the distributed shared memory system comprising a plurality of storage nodes for storing a plurality of versioned data objects;
   executing each task from among the plurality of tasks as a speculative transaction on a respective compute node from among the plurality of compute nodes, wherein the speculative transaction is initiated by assuming that no dependencies exist among the plurality of tasks, and further wherein the executing comprises:
      when a versioned data object from among a plurality of versioned data objects is required for a computation of the speculative transaction and a copy of the versioned data object does not already reside in a local cache, reading the versioned data object from a storage node from among the plurality of storage nodes corresponding to the versioned data object and storing the copy of the versioned data object in the local cache;
      updating a read set corresponding to the speculative transaction; and
      using the copy of the versioned data object from the local cache to complete the computation for the speculative transaction;
   designating each speculative transaction as committable on the basis of a dependency ordering of the plurality of tasks;
   determining whether each committable speculative transaction has any dependency conflicts;
   committing each speculative transaction that is committable and has no dependency conflicts;
   aborting each speculative transaction that is committable and has at least one dependency conflict; and
   re-executing each task corresponding to an aborted speculative transaction if that task is not committed.

2. The method of claim 1, the local cache comprising:
   storage for a read set for each speculative transaction executing on the compute node;
   storage for a write set for each speculative transaction executing on the compute node;
   storage for a dependency graph for tracking local dependencies as they arise; and
   storage for storing a plurality of copied versioned data objects.

3. The method of claim 2, wherein the executing further comprises writing an update to the versioned data object of the speculative transaction, the writing comprising:
   writing a new updated copy of the versioned data object to the local cache with an undetermined version number;
   updating the write set corresponding to the speculative transaction; and
   modifying the dependency graph with the new updated copy of the versioned data object and its dependency on the copy of the versioned data object to which the update was applied.

4. The method of claim 3, wherein the determining of the speculative transaction further comprises:
   a first determining of any conflicts in the dependency graph; and
   a second determining of any conflicts in the read set.

5. The method of claim 4, wherein the second determining comprises:
   for each versioned data object in the read set, locking a corresponding versioned data object in the plurality of storage nodes;
   comparing each versioned data object in the read set to the corresponding versioned data object in the plurality of storage nodes:
   if all of the versioned data objects in the read set are the same version as the corresponding data objects in the storage nodes, then return that no dependency conflicts exist; and
   if any of the versioned data objects in the read set are not the same version as the corresponding data objects in the storage node, then return that dependency conflicts exist.

6. The method of claim 5, wherein the committing further comprises:
   for each versioned data object in the read set, overwriting the corresponding versioned data object in the plurality of storage nodes with the versioned data object in the read set, and incrementing a version indicator for each overwritten corresponding versioned data object in the plurality of storage nodes;
   for each versioned data object in the read set, unlocking the corresponding versioned data object in the plurality of storage nodes;
   updating a task graph for the task corresponding to the speculative transaction; and
   updating the dependency graph for each versioned data object in the read set.

7. The method of claim 6, wherein the task graph is a directed acyclic graph (DAG).

8. The method of claim 5, wherein the aborting further comprises:
   for each versioned data object in the read set, unlocking the corresponding versioned data object in the plurality of storage nodes;
   aborting the speculative transaction;
   aborting any subsequent speculative transactions dependent upon the speculative transaction as indicated by the dependency graph; and
   aborting any subsequent speculative transactions dependent upon the speculative transaction as indicated by the task graph.

9. The method of claim 5, wherein the re-executing comprises re-executing the task on the same compute node.

10. A computer-readable memory device containing computer-readable instructions for execution on a distributed computing system, the computer-readable instructions comprising instructions that:
- for each task from among a plurality of tasks, execute the task as a speculative transaction until the task is committed, wherein the speculative transaction is run assuming that no dependencies exist among the plurality of tasks, and further wherein executing the task comprises:
  - when a versioned data object from among a plurality of versioned data objects is required for a computation of the speculative transaction and a copy of the versioned data object does not already reside in a local cache, reading the versioned data object from a storage node from among the plurality of storage nodes corresponding to the versioned data object and storing the copy of the versioned data object in the local cache;
    - updating a read set corresponding; to the speculative transaction; and
    - using the copy of the versioned data object from the local cache to complete the computation for the speculative transaction;
- designate the speculative transaction as committable when all tasks in a task graph that precede the task corresponding to the speculative transaction have been committed;
- commit the speculative transaction designated as committable if the speculative transaction has no dependency conflicts;
- abort the speculative transaction if the speculative transaction has a dependency conflict; and
- re-execute each task corresponding to an aborted speculative transaction.

11. The computer memory device of claim 10, further comprising instructions that maintain the task graph corresponding to a dependency ordering of the plurality of tasks.

12. The computer memory device of claim 10, further comprising instructions that track each speculative transaction's reads in a read set and track each speculative transaction's writes in a write set.

13. The computer memory device of claim 10, further comprising instructions that detect a dependency conflict, abort at least one speculative transaction, and abort at least one additional speculative transaction that is subsequent to the at least one speculative transaction.

14. The computer memory device of claim 10, further comprising instructions that, for each versioned data object in the local cache of a compute node, maintain a sorted list of object versions.

15. A system for distributed computing comprising:
- a distributed shared memory comprising a plurality of storage nodes for storing a subset of versioned data objects from among a plurality of versioned data objects;
- a distributed computing subsystem comprising a plurality of compute nodes for executing a program,
  - wherein the program is divided into a plurality of tasks for execution as transactions and a task graph corresponding to a dependency ordering of the plurality of tasks,
  - wherein the transactions are speculative transactions that presume that its corresponding task from among the plurality of tasks has no dependencies and that any versioned data objects used are valid even though one or both presumptions may not hold true,
  - wherein each compute node from among the plurality of compute nodes further comprises a local cache for maintaining copies of versioned data objects;
  - wherein each compute node reads a versioned data objects from a corresponding storage node from among the plurality of storage nodes and stores a copy of the versioned data object to the local cache when a transaction needs the versioned data object and a copy of the versioned data object is not already present in the local cache;
  - wherein transactions only read the copies of versioned data objects residing in the local cache; and
  - wherein transactions only write updated versioned data objects to the local cache;
- a plurality of computers constituting a cluster for hosting the plurality of storage nodes and the plurality of compute nodes comprising the distributed shared memory and the distributed computing subsystem respectively;
- a control subsystem for determining when a task is committable and either committed or aborted; and
- a roll-back subsystem for aborting the task and at least one additional task dependent upon the aborted task.

16. The system of claim 15, wherein the local cache further comprises a read set and a write set for each transaction on the compute node, a dependency graph for transaction on the compute node, and an ordered list of each versioned data object read and written to the local cache.

17. The system of claim 16, wherein the control subsystem permits each compute node to commit a transaction corresponding to a task from among a plurality of tasks if and only if the transaction has completed running, the task corresponding to the transaction has no preceding tasks in the task graph that have not been committed, the transaction has no dependencies in the dependency graph, the versioned data objects in the transactions write set have no dependencies, and every copy of the versioned data objects in the transactions read set are the same version as the versioned data objects in the plurality of storage nodes.

18. The system of claim 17, wherein the control subsystem is a distributed control subsystem across the plurality of compute nodes and comprising a distributed transactional commit protocol to detect dependency conflicts.

* * * * *